April 29, 1969  E. D. MINTON  3,441,089
CONVERTIBLE LAWN EDGER AND CLEANER
Filed April 12, 1966
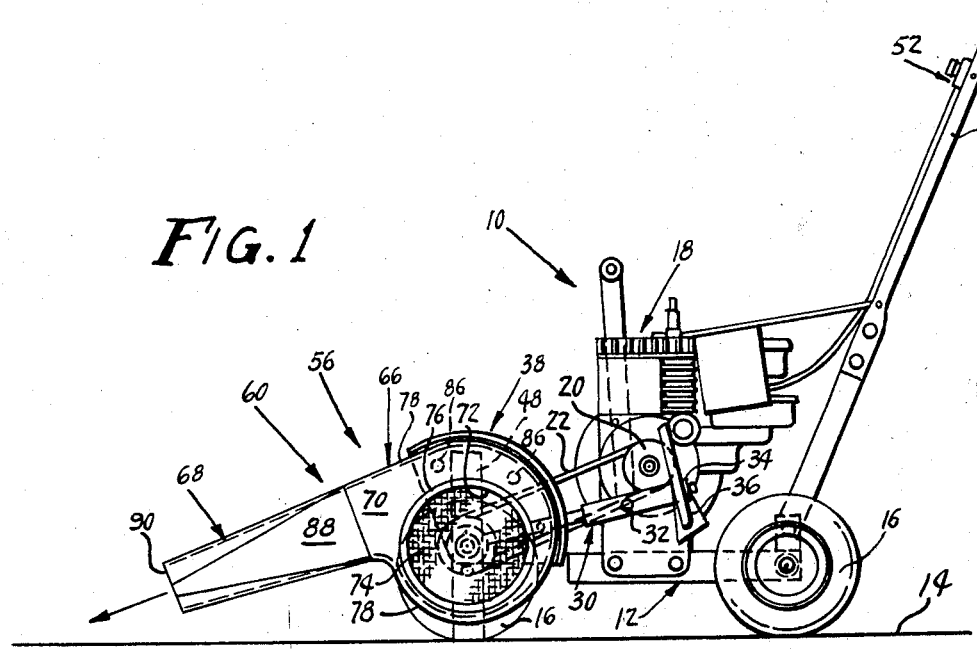
Fig. 1
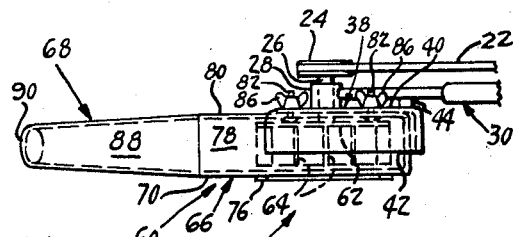
Fig. 2
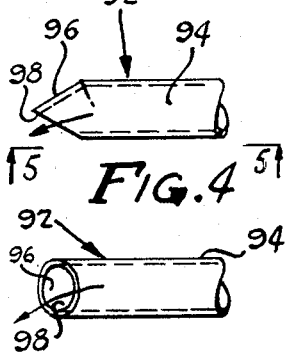
Fig. 4
Fig. 5
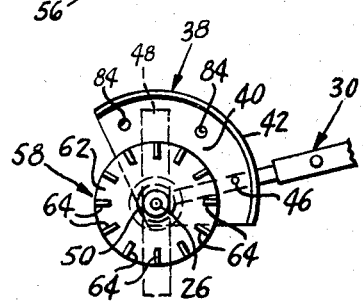
Fig. 3
INVENTOR.
ERNEST D. MINTON
BY *Kimmel, Crowell & Weaver*
ATTORNEYS.

United States Patent Office 3,441,089
Patented Apr. 29, 1969

3,441,089
CONVERTIBLE LAWN EDGER AND CLEANER
Ernest Dale Minton, 1955 N. Garfield,
Pasadena, Calif. 91104
Filed Apr. 12, 1966, Ser. No. 542,174
Int. Cl. A01b 45/00
U.S. Cl. 172—14                    2 Claims

ABSTRACT OF THE DISCLOSURE

A blower attachment for lawn edgers for use in cleaning the edged sidewalks of the material removed by the edging operation. The blower is detachably secured to the frame of the edger, and the blower fan is detachably mounted on the edger shaft after the edger blade has been removed.

---

This invention relates to a convertible lawn edger and cleaning device, and more particularly to a lawn edger of the type having a substantially horizontal transverse rotatable shaft normally carrying a cutting blade for edging turf adjacent a sidewalk or other permanent structure and which may be converted into a cleaning device for removing the cuttings from the sidewalk.

As conducive to an understanding of the instant invention, it should be pointed out that powered lawn edgers are well known in the art and may generally be classified into two different types. The first type is characterized by a separate motivating means, such as an internal combustion engine or the like, operatively connected with the blade carrying shaft for rotating the cutter blade. The second type is generally equipped with one or more ground engaging wheels operatively connected by a drive arrangement to rotate the blade carrying shaft upon rolling advance of the edger across the underlying ground surface.

In the use of all lawn trimmers known, the cutting blade succeeds in cutting a small trough adjacent the sidewalk but also throws a significant quantity of dirt and grass cuttings onto the sidewalk. After the lawn edging operation is complete, the individual must either procure a broom or other cleaning device and sweep the sidewalk or leave the sidewalk in the unsightly condition caused by the scattering of dirt and grass cuttings. When power lawn mowers and power edgers have been used to manicure a lawn, the most arduous and time-consuming effort is often the sweeping of the sidewalks to provide the neat appearance desired. If one desires to use a separate powered implement to avoid this arduous task, an additional capital expenditure is needed.

It is an object of the instant invention to provide a convertible lawn edger and cleaning device for cleaning sidewalks and other similar areas at the end of a lawn cutting and edging operation.

Another object of the instant invention is to provide a cleaning device which may be attached to lawn edgers of conventional type for cleaning sidewalks and other similar areas with a minimum of effort and with a minimum expenditure of additional funds.

A further object of the instant invention is to provide a convertible lawn edger and cleaning device which acts to blow dirt and grass cuttings from a sidewalk onto the grassy area adjacent thereto.

Other objects and advantages of the instant invention reside in the combinations of elements, arrangements of parts, and features of construction and operation, all as will be more fully pointed out hereinafter and disclosed in the accompanying drawing wherein there is shown a preferred embodiment of this invention concept.

In the drawing:

FIGURE 1 is a side elevational view of a powered lawn edger to which the cleaning attachment of the instant invention is connected;

FIGURE 2 is a partial plan view of the convertible lawn edger and cleaning device of FIGURE 1;

FIGURE 3 is a partial side elevational view of the lawn edger of FIGURE 1 illustrating the conventional shield, the removable cutting blade and the blower fan which has been positioned on the rotating shaft after removing the blade;

FIGURE 4 is an enlarged partial view of another form of fan housing of the instant invention for directing the stream of air from the blower fan to move the scattered dirt and grass cuttings laterally of the sidewalk toward the grassy area; and FIGURE 5 is a view of the modified form of the fan housing outlet as may be seen from along line 5—5 in FIGURE 4.

Referring now to the drawing in detail, wherein like reference characters designate like elements throughout the several views thereof, there is indicated generally at 10 a conventional powered lawn edger having a frame shown generally at 12 movably mounted on an underlying ground surface 14 by a plurality of ground engaging wheels 16. An internal combustion engine shown generally at 18 is affixed to frame 12 and is operatively connected by a conventional drive pulley 20, belt 22 and driven pulley 24 to rotate a substantially horizontal transverse shaft 26 affixed to driven pulley 24.

Shaft 26 is journaled in a bearing 28 carried by a brace shown generally at 30 which is pivotally mounted on frame 12 by a pivot pin 32. The other end of brace 30 is adjustably fixed by a nut 34 in a slot formed in plate 36.

It will be apparent that the arrangement of brace 30, pivot pin 32, nut 34 and plate 36 allows bearing 28 to be adjusted upwardly and downwardly to tension belt 22 and to position shaft 26 at an appropriate level. It should be understood, however, that any suitable belt tightening means and any suitable height adjusting means may be provided since they are merely a background for the instant invention and do not constitute a part thereof.

Bearing 28 fixedly carries a blade shield shown generally at 38 constituting a substantially flat plate 40 having an arcuate outwardly extending flange 42 thereon preventing the cutting blade from throwing pebbles and the like toward the operator and largely shielding the cutting blade to prevent injury to the individual. Aiding in the rigidifying of brace 30 is a pin 44 on the lower end thereof adjacent shield plate 40 as may be seen best in FIGURE 2. Pin 44 is preferably spring biased toward shield plate 40 to reside in an aperture 46.

As may be seen best in FIGURE 3, shaft 26 normally perpendicularly carries a conventional cutting blade 48 removably affixed thereto by a nut 50. Although the connection between blade 48 and shaft 26 is not clearly shown, it should be understood that any conventional blade locking mechanism may be used, such as by providing a pair of nuts 50 on the threaded end of shaft 26 with blade 48 being sandwiched therebetween. In using lawn edger 10 for trimming grass adjacent a sidewalk or the like, cutting blade 48 is affixed to shaft 26 with engine 18 being controlled by a conventional accelerator and clutching mechanism shown generally at 52 on handle 54. When engine 18 is started and drivingly connected to pulley 20, shaft 26 and cutting blade 48 will rotate to edge the lawn in a conventional manner.

When the lawn edging operation is completed and it is desired to clean the sidewalk or other area onto which dirt and grass cuttings have been thrown, the individual removes cutting blade 48 and affixes to lawn edger 10 a cleaning attachment shown generally at 56. A fan shown generally at 58 and a housing shown generally at 60 constitute the major components of cleaning mechanism 56. Although fan 58 is illustrated as of the squirrel cage variety having a flat plate 62 perpendicular to shaft 26 and a plurality of blades 64 parallel to shaft 26, it should be understood that fan 58 may be of any type sufficient to provide a moving stream of air for blowing scattered dirt and grass from surface 14.

It will be readily apparent that nut 60 is unthreaded from the end of shaft 26 to remove cutting blade 48. Plate 62 of fan 58 is provided with a central aperture for receiving shaft 26 and is inserted thereover after the removal of blade 48. Nut 50 is then rethreaded onto the end of shaft 26 to secure fan 58 thereon. FIGURE 3 is illustrative of the lawn edger at this stage of assembling cleaning attachment 56.

Fan housing 60 is composed of two segments, a fan surrounding section shown generally at 66 and an air directing section shown generally at 68. Fan surrounding section 66 includes a front wall 70 forming an inlet opening 72 covered by a screen guard 74 affixed to front wall 70 by an annular ring 76 integral with screen guard 74 and a plurality of conventional fasteners (not shown). Fan surrounding section 66 also includes an arcuate side wall 78 connecting front wall 70 to a rear wall 80 as may best be seen in FIGURE 2. Rear wall 80 is provided with an enlarged central aperture for receiving shaft 26 during the assembly of cleaning attachment 56.

A pair of threaded screws 82 are perpendicularly secured to rear wall 80 and are received in a pair of apertures 84 formed in shield plate 40 as shown best in FIGURE 3. After fan 58 has been secured to shaft 26, housing 60 is secured to shield 38 by inserting screws 82 through apertures 84 and affixing a wing nut 86 on the outer end of screw 82. Although it should be understood that any suitable form of releasable connecting means may be provided between housing 60 and lawn edger 10, the illustrated connection is preferred for reasons of simplicity, ease in assembly and disassembly, and low cost.

Air directing section 68 of housing 60 includes a closed generally tubular wall 88 in fluid communicating relation with fan surrounding section 66 and is downwardly inclined to position outlet 90 adjacent ground surface 14 for efficiently scattering the accumulated dirt and grass in a desired direction. As is evident from the foregoing discussion, the individual will start engine 18 and manpulate controls 52 to rotate fan 58. A stream of air is inducted through inlet opening 72 and expelled through outlet 90 to propel the grass and dirt accumulated on surface 14 in a desired direction.

Referring now to FIGURES 4 and 5, another form of air directing section is shown generally at 92 and includes a closed substantially tubular wall 94 having an outwardly directed terminus 96 forming an outlet opening 98. When using the embodiment of FIGURES 4 and 5, the stream of air propelled through air directing section 92 will exit at an angle with respect to the direction of travel of edger 10 such that the accumulated dirt and grass on surface 14 is blown to the side onto the grassy area adjacent thereto.

It is now seen that there is herein provided an improved convertible lawn edger and cleaning device which accomplishes all of the objects of the instant invention and others including many advantages of great practical utility and commercial importance.

Since many embodiments may be made of the instant inventive concept, and since many modifications may be made in the embodiments hereinbefore shown and described, it is understood that the foregoing is to be interpreted merely as illustrative and not in a limiting sense.

I claim:
1. A convertible lawn edger and cleaner comprising a mobile frame,
a substantially horizontal transverse shaft rotatably mounted on the frame and adapted to detachably carry a cutting blade for edging turf adjacent a permanent structure,
power means on said frame for rotating said shaft,
a plate secured to said frame adjacent said shaft and arranged in a generally vertical plane,
a semicircular flange integrally formed on said plate and adapted to overlie said shaft,
a blower housing detachably secured to said plate with said shaft extending into said blower housing,
said housing having a downwardly and forwardly extending air directing section and an air inlet,
a blower fan in said blower housing detachably mounted on said shaft for inducting air through the inlet and forcing it through the outlet upon rotation of said shaft.
2. A device as claimed in claim 1 wherein said blower housing on said plate is positioned within the arc of said semicircular flange.

References Cited

UNITED STATES PATENTS

| | | | |
|---|---|---|---|
| 1,932,511 | 10/1933 | Clarke | 143—157 |
| 2,148,841 | 2/1939 | Senior | 172—14 |
| 2,736,606 | 2/1956 | Kmiotek | 239—351 |
| 2,775,856 | 1/1957 | Hoch | 172—14 X |
| 3,267,974 | 8/1966 | Elson | 143—157 |

ABRAHAM G. STONE, *Primary Examiner.*

J. W. PETERSON, *Assistant Examiner.*